US005400257A

United States Patent [19]

Krinsky et al.

[11] Patent Number: 5,400,257

[45] Date of Patent: Mar. 21, 1995

[54] METHOD OF PRODUCING A BATIK TYPE IMAGE ON CLOTH

[76] Inventors: Michael C. Krinsky, 1053 Jaffrey Rd., Marlborough, N.H. 03455; Michael McGloin, 291 Winchester St., Keene, N.H. 03431

[21] Appl. No.: 199,556

[22] Filed: Feb. 22, 1994

[51] Int. Cl.[6] .......................... G06F 15/46; D06P 5/00

[52] U.S. Cl. ........................................ 364/470; 8/478; 8/485

[58] Field of Search ...................... 364/468,470; 8/482, 8/485, 478, 447, 497; 428/906.6, 196, 201; 118/33, 13; 427/273, 155; 2/243.1; 206/575; 395/129, 131, 140

[56] References Cited

U.S. PATENT DOCUMENTS

| | | | |
|---|---|---|---|
| 3,840,113 | 10/1974 | Bartleson | 206/575 |
| 4,025,963 | 5/1977 | Suita | 2/243.1 |
| 4,147,507 | 4/1979 | Laus | 8/497 |
| 4,254,520 | 3/1981 | Saurman | 8/447 |
| 4,370,941 | 2/1983 | Belton | 118/13 |
| 4,675,023 | 6/1987 | Hyink | 8/447 |
| 5,066,535 | 11/1991 | Christie | 428/196 |
| 5,288,322 | 2/1994 | Hanna et al. | 118/33 |

*Primary Examiner*—James P. Trammell

*Attorney, Agent, or Firm*—Daniel J. Bourque; Anthony G. M. Davis; Michael J. Bujold

[57] ABSTRACT

A method for producing a Batik-type image on cloth. Artwork is generated manually or via a computer graphic art program, which contains an outline of a Batik-type image to be produced on cloth. The outline simulates wax drip lines. Coloration is then added to selected areas, and the artwork is color separated into individual images. Simulated wax crack lines are then added to the color separations. Screens for each individual color are produced, and the cloth is printed using a discharge type ink. The result is an image very similar to Batik style dyeing.

17 Claims, 1 Drawing Sheet

METHOD OF PRODUCING A BATIK TYPE IMAGE ON CLOTH

FIELD OF THE INVENTION

This invention relates to a method for printing or dyeing a pattern on cloth, and more particularly to a method for producing a Batik looking image or pattern on cloth.

BACKGROUND OF THE INVENTION

Batik is a technique of dying images and designs on cloth. The artist pours melted wax onto predetermined areas on the cloth where he does not want a certain color, whereupon the cloth is immersed in dye. The unwaxed areas of fabric absorb the dye, producing a pattern when the wax is removed. Images including multiple colors are produced by systematically applying wax to various areas of the cloth and immersing the cloth in different color dyes.

One technique that is unique to the Batik process is that once the wax is applied to the cloth and has hardened, the cloth can be flexed to cause cracks in the wax coating. When a subsequent dye color is applied (such as the final cloth color), the dye will penetrate these cracks to dye the fabric. This produces an effect on the image of a number of randomly oriented lines of varying thickness in the pattern. The color of the crack lines will depend upon the order of the dyes used. These crack lines are unique to this Batik method.

Another feature of Batik is that the individual pattern line thickness and shading will vary depending on how the artist applies the melted wax. For example, wax can be poured on to create lines that vary in both thickness and density.

The Batik method, however, is a slow, labor intensive process that does not lend itself to mass production. The artist or creator must manually apply the wax for the image, and then dye the cloth. Then more wax must be applied to other areas, and then dyed again. Often wax must also be removed from sections. These steps must be repeated for each color. The final dye color is what the color of the remaining unwaxed portions of the cloth will be. This processing must be performed on each cloth item. Therefore, each finished batik is unique, both in artistic layout and in bleed-through from wax crack line.

Also, in multi-colored designs, large areas of the cloth end up being repeatedly dyed several different colors since all unwaxed areas are exposed to each dye immersion. This consumes excess dye and increases costs.

SUMMARY OF THE INVENTION

This invention features a method of producing a Batik-type image on cloth. Artwork is created or obtained which contains an outline of an image to be produced on cloth, wherein selected areas are chosen for coloration. Simulated wax crack lines are added to at least one of the areas chosen for coloration, and then the image is color film separated for printing. Printing screens are then generated, and the cloth is printed with a discharge type ink or other ink or dye which replaces the dye presently in the cloth fiber with the dye in the discharge type ink or dye. The artwork originally used includes outline regions or lines that vary in thickness to simulate wax dripped lines. Such artwork may be created by hand or by using a computer graphic program. The wax crack lines may be simulated by scratching the color film separation, or if created on a computer graphic program, by drawing randomly oriented lines on the color separated images. The discharge type ink or dye used to print on cloth can be water based. This technique can be used to print on any type of cloth or clothing, including t-shirts and decorative wall hangings.

BRIEF DESCRIPTION OF THE DRAWING

These and other features and advantages of the present invention will be better understood by reading the following detailed description, taken together with the drawings wherein.

DETAILED DESCRIPTION OF THE PREFERRED EMBODIMENT

Figure 1:
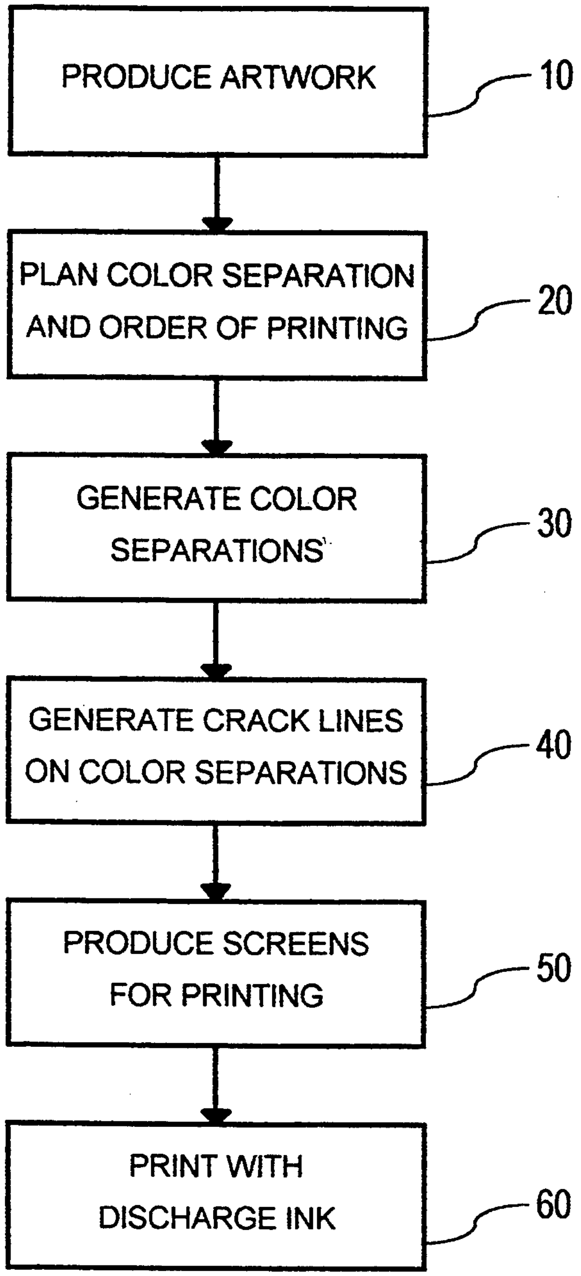
FIG. 1 is a block diagram illustrating the method of producing a Batik like image according to the present invention.

The present invention features a method of providing a Batik looking image without the laborious, traditional wax dripping process. The method begins by first producing artwork of the desired image, step 10, FIG. 1, followed by planning the various color separations required, step 20.

There are several ways to prepare the artwork and color separations to produce the Batik-type image on cloth in accordance with the presently disclosed invention. The first method is manually by providing an outline, corresponding to a dripping, wax on a piece of paper, canvas, bristol board or any other drawing or graphic surface. The line thickness of the outline should be varied to make lines appear as wax dripped lines. For planning additional colors, the original line drawing may be placed on a light table, and separate pieces of paper are overlayed and filled in where the desired colors will be, with large dark or black areas.

When the separations are complete, step 30, a white marker or white-out is used to generate the crack lines will would be left over from the Batiking process, step 40. It must be remembered that the black areas will be where the dye will penetrate the cloth, and any white area is where the color of the cloth it will be printed on will appear through. When the separations are complete, they are taken to a camera to generate plastic transparencies, that will then be used to generate the screen printing screens, step 50.

In another embodiment, the process as previously described in steps 10 through 30 are performed to the point of color separating the image. Then the artwork is taken directly to the camera and plastic transparent film is created. Crack lines can then be manually applied by scratching lines into the black area of the actual film, using a knife or similar tool.

In another embodiment, the artwork is generated by a computer graphic paint program such as, an Adobe Photo Shop For PCs. The process may then start with a small fine line drawing preferably two by two inches in size. This image may be scanned into the computer system or drawn on the screen. Keeping the image small in the beginning stages cuts down on time and computer memory and makes the final image more resemble a Batik image.

With the beginning image on the screen, lines may be added and line thickness varied to produce a Batik like effect. This image is then saved to a file. The image is then called back to the screen wherein, the paint brush option is used to fill in one or more area(s) within the drawing to be of a first color. This image is then saved to a file of a different name, and the step repeated for each area(s) of different color(s), resulting in several files, each with a different color outline. Many programs such as the Adobe Photo Shop allow the user to check the final result by calling up the different color separations and overlaying them on top of each other.

To add crack lines to the computer images, the images are called up one at a time and increased to actual output size. Using the smallest paint brush option available, wax crack lines are added to the individual images. The line size may be varied by using different size paint brushes to simulate random wax crack lines.

Using a computer graphics program, it is also possible to generate a single image with only the wax crack lines on it, and then superimpose this image on other images to allow the cracks to appear on those images. This method, however, does not produce the best crack pattern. It has been found that the best effect for crack lines requires deliberate planning as to where to put the crack lines onto the image. Randomly placed crack lines do not look good.

Once the computer artwork is complete, it can be printed out on any device such as an ink jet printer, plotter, color copier, or laser printer. The line output should be between thirty to fifty-five lines per inch, depending on the screen mesh of the silk screen to be used. The dot structure optimally would be elliptical or round to allow some bleed. Dot angle should be different odd numbers so that Morray patterns are avoided. The images then may be retouched and shot with a stat camera.

The transparencies are then used to generate converted printing screens utilizing the usual process. Screens can have a mesh of between 86 and 245, with a screen mesh of 156 or 160 working best.

Printing is achieved using discharge ink or dye, step 60. The ink or dye goes into the dark dyed fabric and in the drying process the discharge agent pulls or removes the dye from the cloth fibers and in its place, leaves the color of the discharge ink or dye. When the fabric is washed, there is no difference between the print and the original fabric. The ink or dye is not simply on top of the fabric, instead the fibers take on the color of the dye. This simulates the Batik look and feel.

In the preferred embodiment, the discharge ink or dye is water based although other types of discharge inks or dyes and inks which have the same properties as discharge ink or dye are considered to be within the scope of the present invention.

The final result is an image which resembles Batik in all ways: crack lines, bleed through, varying width lines, and an embedded dyed image. However, the cost is much lower, and allows for mass production of the items.

Although this invention has been described in conjunction with manual and computer methods, portions of each method may be utilized and/or combined with portion(s) of the other method to achieve the intended results without departing from the scope of the present invention.

Modifications and substitutions by one of ordinary skill in the art are considered to be within the scope of the present invention which is not to be limited except by the claims which follow.

What is claimed is:

1. A method of producing a Batik type image on a cloth-like member, comprising:
 - providing artwork representing at least an outline of a Batik-type image to be produced on cloth;
 - applying at least one shading of coloration to at least one predetermined area of said artwork;
 - applying simulated wax crack lines to said at least one predetermined area of shading of coloration;
 - generating at least a first color film separation for said at least one predetermined area of shading of coloration including said simulated wax crack lines, and at least a second color film separation for said at least an outline of a Batik-type image to be produced;
 - generating at least first and second corresponding screen printing screen member for said at least a first color film separation and for said at least a second color film separation of said Batik-type image to be produced;
 - providing a cloth-like member on which said Batik type image is to be produced, said cloth-like member having a preselected color; and
 - screen printing, with discharge type ink, said at least an outline of a Batik-type image and said at least one predetermined area of shading of coloration including said simulated wax crack lines using said first and second corresponding screen printing screen members, to produce said batik type image on said cloth-like member.

2. The method of claim 1, wherein lines in said at least an outline of said Batik-type image to be produced on cloth vary in thickness to simulate wax dripped lines.

3. The method of claim 1, wherein said cloth-like member includes an item of clothing.

4. The method of claim 3, wherein said item of clothing includes a shirt.

5. The method of claim 1, wherein said cloth-like member includes a decorative wall hanging.

6. The method of claim 1, wherein said artwork is provided and at least first and second color film separations generated using a computer graphic art program.

7. The method of claim 6, wherein said at least a first computer generated color film separation includes said simulated wax crack lines.

8. The method of claim 7, wherein said simulated wax crack lines are applied using a computer graphic program.

9. The method of claim 6, wherein said computer generated artwork includes outline lines that vary in thickness to simulate wax dripped lines.

10. The method of claim 1, wherein said discharge type ink is water based.

11. A method of producing a Batik type image on a cloth-like member, comprising:
 - providing artwork representing at least an outline of a Batik-type image to be produced on cloth;
 - applying at least one shading of coloration to at least one predetermined area of said artwork;
 - generating at least a first color film separation for said at least one predetermined area of shading of coloration;
 - applying simulated wax crack lines to at least said at least one predetermined area of shading of coloration by scratching lines onto said at least a first color film separation for said at least one predetermined area of shading of coloration;

generating at least a second color film separation for said at least an outline of a Batik-type image to be produced;

generating at least first and second corresponding screen printing screen member for said at least a first color film separation and for said at least a second color film separation of said Batik-type image to be produced.;

providing a cloth-like member on which said Batik type image is to be produced, said cloth-like member having a preselected color; and screen printing, with discharge type ink, said at least an outline of a Batik-type image and said at least one predetermined area of shading of coloration including said simulated wax crack lines using said first and second corresponding screen printing screen members, to produce said batik type image on said cloth-like member.

12. The method of claim 11, wherein outline lines in said at least an outline of said Batik-type image to be produced on cloth vary in thickness to simulate wax dripped lines.

13. The method of claim 12, wherein said cloth-like member includes an item of clothing.

14. The method of claim 13, wherein said item of clothing includes a shirt.

15. The method of claim 11, wherein said cloth-like member includes a decorative wall hanging.

16. The method of claim 11, wherein said discharge type ink is water based.

17. The method of claim 11, wherein said step of generating at least a second color film separation for said at least an outline of a Batik-type image to be produced is performed before the step of applying simulated crack lines; and said step of applying simulated crack lines includes scratching lines onto said at least a second color film separation for at least an outline of a Batik-type image to be produced.

* * * * *